(12) United States Patent
Barak et al.

(10) Patent No.: US 7,420,950 B2
(45) Date of Patent: Sep. 2, 2008

(54) MULTIPLEX COMMUNICATION WITH SLOTTED RETRANSMISSION ON DEMAND

(75) Inventors: Ilan Saul Barak, Kfar Saba (IL); Ofer Shneyour, Hod-Hasharon (IL)

(73) Assignee: DSPG Ltd., Herzliya (IL)

( * ) Notice: Subject to any disclaimer, the term of this patent is extended or adjusted under 35 U.S.C. 154(b) by 1057 days.

(21) Appl. No.: 10/818,774

(22) Filed: Apr. 5, 2004

(65) Prior Publication Data

US 2005/0226198 A1    Oct. 13, 2005

(51) Int. Cl.
*H04J 3/00*  (2006.01)
(52) U.S. Cl. ........................ 370/337; 370/347
(58) Field of Classification Search .............. 370/329, 370/330, 336, 337, 341, 343, 344, 347
See application file for complete search history.

(56) References Cited

U.S. PATENT DOCUMENTS

| | | | | |
|---|---|---|---|---|
| 5,640,395 A | * | 6/1997 | Hamalainen et al. | 370/322 |
| 5,838,668 A | * | 11/1998 | Okada et al. | 370/312 |
| 6,151,329 A | * | 11/2000 | Berrada et al. | 370/447 |
| 6,157,632 A | * | 12/2000 | Cudak et al. | 370/348 |
| 6,907,005 B1 | * | 6/2005 | Dahlman et al. | 370/236 |
| 7,103,371 B1 | * | 9/2006 | Liu | 455/456.4 |
| 7,133,396 B1 | * | 11/2006 | Schmidl et al. | 370/347 |
| 7,277,411 B2 | * | 10/2007 | Shneyour et al. | 370/337 |
| 2003/0086406 A1 | * | 5/2003 | Batra et al. | 370/345 |

OTHER PUBLICATIONS

The Specification of the Bluetooth System, vol. 1, Version 1.2 (Bluetooth SIG, Inc., 2003).
The Specification of the Bluetooth System, vol. 2, Version 1.2 (Bluetooth SIG, Inc., 2003).

\* cited by examiner

*Primary Examiner*—Blane J Jackson
(74) *Attorney, Agent, or Firm*—Blakely, Sokoloff, Taylor & Zafman

(57) ABSTRACT

A method for communication in a sequence of frames includes assigning a respective time slot to each of a plurality of mobile units, while reserving an unassigned time slot. During a first frame, one of the mobile units transmits an uplink signal in the respective time slot, carrying first uplink data over the air to a base station. The base station transmits a downlink signal to the mobile unit indicating that retransmission of the first uplink data is required. Responsively to the downlink signal, during a second frame subsequent to the first frame, the mobile unit transmits the uplink signal both in the respective time slot and in the reserved time slot so as to carry the first uplink data and second uplink data over the air to the base station. A similar method may be used for downlink retransmission.

36 Claims, 5 Drawing Sheets

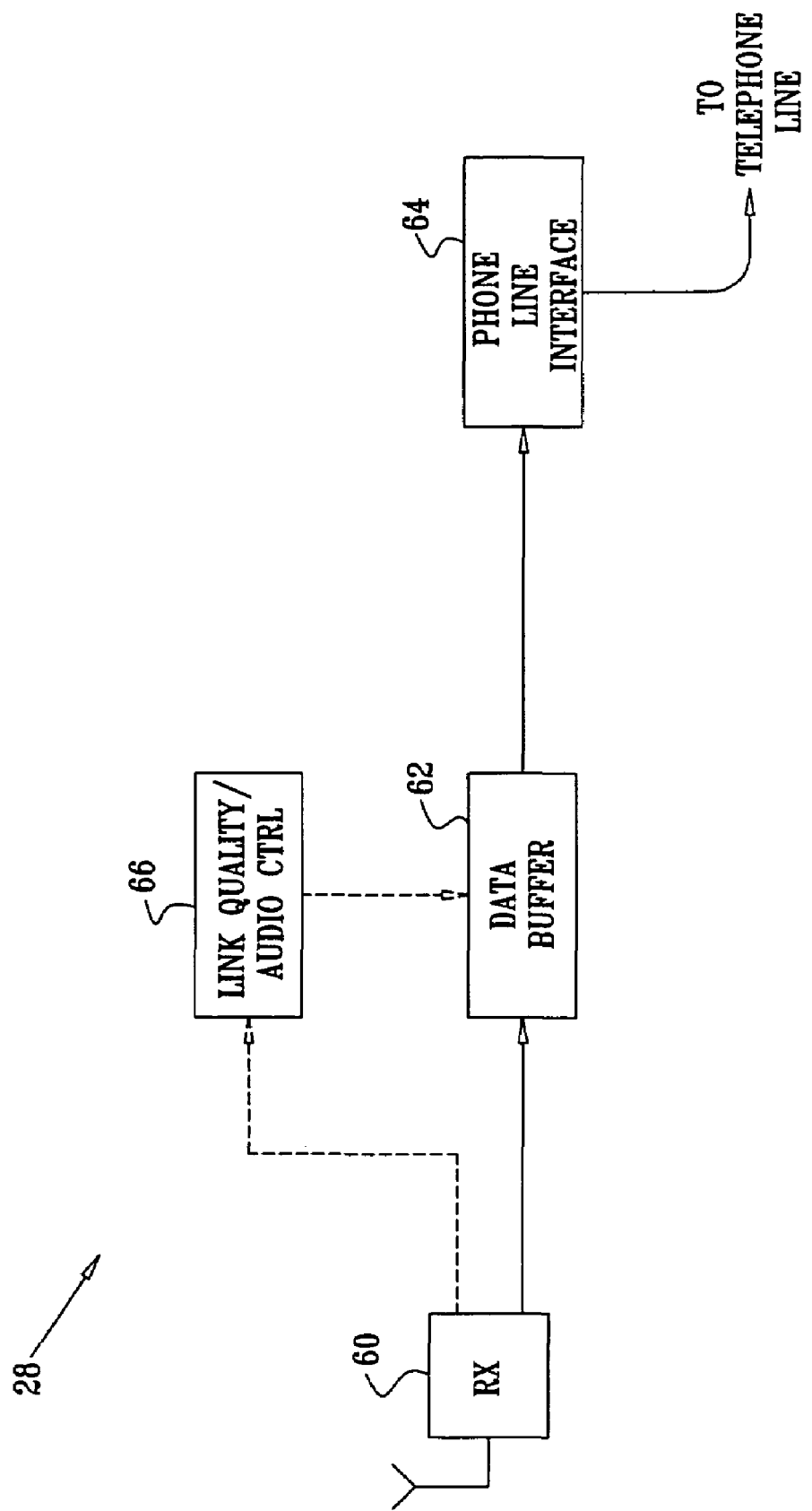

MULTIPLEX COMMUNICATION WITH SLOTTED RETRANSMISSION ON DEMAND

FIELD OF THE INVENTION

The present invention relates generally to communication systems, and specifically to retransmission schemes for time-division multiplex (TDM) communications.

BACKGROUND OF THE INVENTION

Frequency hopping is commonly used in high-frequency wireless communication systems to reduce interference. In some frequency bands, frequency hopping is employed in order to meet regulatory requirements, such as Federal Communications Commission (FCC) Part 15B. The Bluetooth® wireless system, which operates in the unlicensed ISM band at 2.4 GHz, uses frequency hop transceivers to combat interference and fading. Bluetooth is described in the *Specification of the Bluetooth System*, vol. 1, version 1.2 (Bluetooth SIG, Inc., 2003), which is available at www.bluetooth.com.

Bluetooth technology provides the effect of full duplex transmission through the use of a time-division duplex (TDD) scheme. In this scheme, the physical channel is sub-divided into time units known as slots. Data are transmitted between Bluetooth devices in packets, which are positioned in these slots. When circumstances permit, a number of consecutive slots may be allocated to a single packet. Frequency hopping takes place between the transmission or reception of packets. Bluetooth provides a number of different logical transport protocols, among them the extended synchronous connection-oriented (eSCO) logical transport. eSCO provides a point-to-point link between a master transceiver and a specific slave transceiver. It reserves slots on the physical channel and can therefore be considered as a circuit-switched connection between the master and the slave. eSCO links also can offer limited retransmission of packets in the slots that follow the reserved slots. Otherwise these slots may be used for other traffic.

SUMMARY OF THE INVENTION

Embodiments of the present invention provide efficient retransmission mechanisms for use in time-division multiplexed (TDM) communication systems. These mechanisms permit a retransmission slot to be shared among multiple mobile transceivers, thus making efficient use of radio resources and available bandwidth.

In embodiments of the present invention, a base station communicates over the air with multiple mobile units, which have respective, assigned time slots. Typically, the communication time base used by the base station and mobile units is divided into a succession of frames In each frame, each mobile unit is assigned an uplink time slot (for transmitting data to the base station), and a downlink time slot (during which the base station transmits to the mobile unit). In addition, at least one unassigned time slot is reserved for retransmission when required. When the base station fails to receive a transmission from one of the mobile units with adequate quality in one frame, it instructs the mobile unit to retransmit the same data in the next frame. In response, in the next frame, the mobile unit uses both its own assigned slot and a reserved slot in the next frame in order both to retransmit the data from the first frame and to transmit its second frame data. This mechanism permits synchronous transmission of a data stream, such as an audio data stream, generally without loss of data. A similar mechanism is used for downlink retransmission when required.

Typically, no more than one mobile unit will require retransmission in any given frame. When it does occur, however, that the number of mobile stations requiring retransmission exceeds the number of time slots reserved for retransmission, the base station arbitrates among the mobile stations, and selects the mobile station (or stations) that will have use of the reserved time slot (or slots) in the next frame. In this way, contention for the reserved slots is resolved by the base station simply and unequivocally.

In some embodiments of the present invention, transmission between the mobile stations and the base station uses a frequency hopping scheme, with a different frequency assigned to each time slot. Furthermore, different frequency assignments are typically used for the time slots in successive frames. Therefore, when data must be retransmitted to or from a given mobile station, the retransmission will take place at a different frequency from the original, unsuccessful transmission. This feature of the present invention provides frequency diversity "on demand," i.e., only when required, in order to combat transient effects of fading or interference. In this manner, the present invention can provide the benefits of frequency diversity, in terms of improved quality of reception, without the additional radio resources and bandwidth and increased power consumption that are characteristic of frequency diversity systems known in the art.

There is therefore provided, in accordance with an embodiment of the present invention, a method for communication in a sequence of frames, each frame including multiple time slots, the method including:

assigning a respective time slot to each of a plurality of mobile units, while reserving an unassigned time slot;

during a first frame, transmitting an uplink signal carrying first uplink data over the air to a base station from one of the mobile units in the respective time slot;

transmitting a downlink signal from the base station to the one of the mobile units indicating that retransmission of the first uplink data is required; and responsively to the downlink signal, during a second frame subsequent to the first frame, transmitting the uplink signal both in the respective time slot and in the reserved time slot so as to carry the first uplink data and second uplink data over the air to the base station.

In some embodiments, assigning the respective time slot includes assigning a respective frequency for use in transmission during each of the time slots according to a predetermined frequency hopping scheme. Typically, transmitting the uplink signal during the first frame includes transmitting the uplink signal at a first frequency, and transmitting the uplink signal during the second frame includes transmitting the uplink signal at one or more second frequencies, which are different from the first frequency.

In a disclosed embodiment, transmitting the uplink signal includes transmitting respective first and second uplink signals from first and second mobile units among the plurality of the mobile units in respective, first and second time slots, and transmitting the downlink signal includes selecting one of the first and second mobile units to retransmit the respective first or second uplink signal in the reserved time slot, and notifying the selected one of the first and second mobile units that the retransmission is required.

In some embodiments, the method includes buffering the first and second uplink data at the base station, and conveying the buffered data from the base station to a destination in a continuous data stream. Typically, buffering the first and second uplink data includes controlling a length of a buffer in which the uplink data are held responsively to at least one of a quality of the uplink signal and an audio content of the uplink signal. In a disclosed embodiment, controlling the length of the buffer comprises, while the audio content comprises voice data, at least one of lengthening the buffer gradually as the quality of the uplink signal degrades, and shortening the buffer gradually as the quality of the uplink signal improves. Additionally or alternatively, controlling the length of the buffer comprises, when the uplink signal comprises no audio content, at least one of lengthening and shortening the buffer abruptly.

In one embodiment, the method includes, upon a failure to receive the downlink signal at the one of the mobile units, transmitting the uplink signal both in the respective time slot and in the reserved time slot so as to carry the first uplink data and second uplink data over the air to the base station during the second frame.

There is also provided, in accordance with an embodiment of the present invention, a method for communication in a sequence of frames, each frame including multiple time slots, the method including:

assigning a respective time slot to each of a plurality of mobile units, while reserving an unassigned time slot;

during a first frame, transmitting a downlink signal carrying first downlink data over the air from a base station to one of the mobile units in the respective time slot;

transmitting an uplink signal from the one of the mobile units to the base station indicating that retransmission of the first downlink data is required; and responsively to the uplink signal, during a second frame subsequent to the first frame, transmitting the downlink signal both in the respective time slot and in the reserved time slot so as to carry the first downlink data and second downlink data over the air to the one of the mobile units.

In a disclosed embodiment, transmitting the downlink signal during the first frame includes transmitting respective first and second downlink signals to first and second mobile units among the plurality of the mobile units in respective, first and second time slots, and transmitting the uplink signal includes transmitting first and second uplink signals indicating that the retransmission is required, and transmitting the downlink signal during the second frame includes selecting one of the first and second mobile units, and transmitting the downlink signal both in the respective time slot and in the reserved time slot to the selected one of the first and second mobile units.

There is additionally provided, in accordance with an embodiment of the present invention, apparatus for communication, including a base station and a plurality of mobile units, which are adapted to communicate using a sequence of frames, each frame including multiple time slots, wherein a respective time slot is assigned to each of the mobile units, while reserving an unassigned time slot, wherein each of the mobile units among the plurality of the mobile units is adapted to transmit an uplink signal in the respective time slot during a first frame, the uplink signal carrying first uplink data over the air to the base station, and wherein the base station is adapted, upon receiving the uplink signal, to transmit a downlink signal to a given mobile unit indicating that retransmission of the first uplink data is required, and wherein the given mobile unit is adapted, responsively to the downlink signal, to transmit the uplink signal during a second frame, subsequent to the first frame, both in the respective time slot and in the reserved time slot so as to carry the first uplink data and second uplink data over the air to the base station.

There is further provided, in accordance with an embodiment of the present invention, apparatus for communication, including a base station and a plurality of mobile units, which are adapted to communicate using a sequence of frames, each frame including multiple time slots, wherein a respective time slot is assigned to each of the mobile units, while reserving an unassigned time slot, wherein the base station is adapted to transmit a downlink signal carrying first downlink data over the air to each of the mobile units in the respective time slot during a first frame, the downlink signal carrying first downlink data over the air to each of the mobile units, and wherein when a given mobile unit among the plurality of the mobile units determines, upon receiving the downlink signal, that retransmission of the first downlink data is required, the given mobile unit is adapted to transmit an uplink signal to the base station requesting the retransmission, and wherein the base station is adapted, responsively to the uplink signal, to transmit the downlink signal during a second frame, subsequent to the first frame, both in the respective time slot and in the reserved time slot so as to carry the first downlink data and second downlink data over the air to the given mobile unit.

The present invention will be more fully understood from the following detailed description of the embodiments thereof, taken together with the drawings in which:

BRIEF DESCRIPTION OF THE DRAWINGS

FIG. 4 is a block diagram that schematically shows elements of a wireless telephone base station, in accordance with an embodiment of the present invention.

DETAILED DESCRIPTION OF EMBODIMENTS

Figure 1:
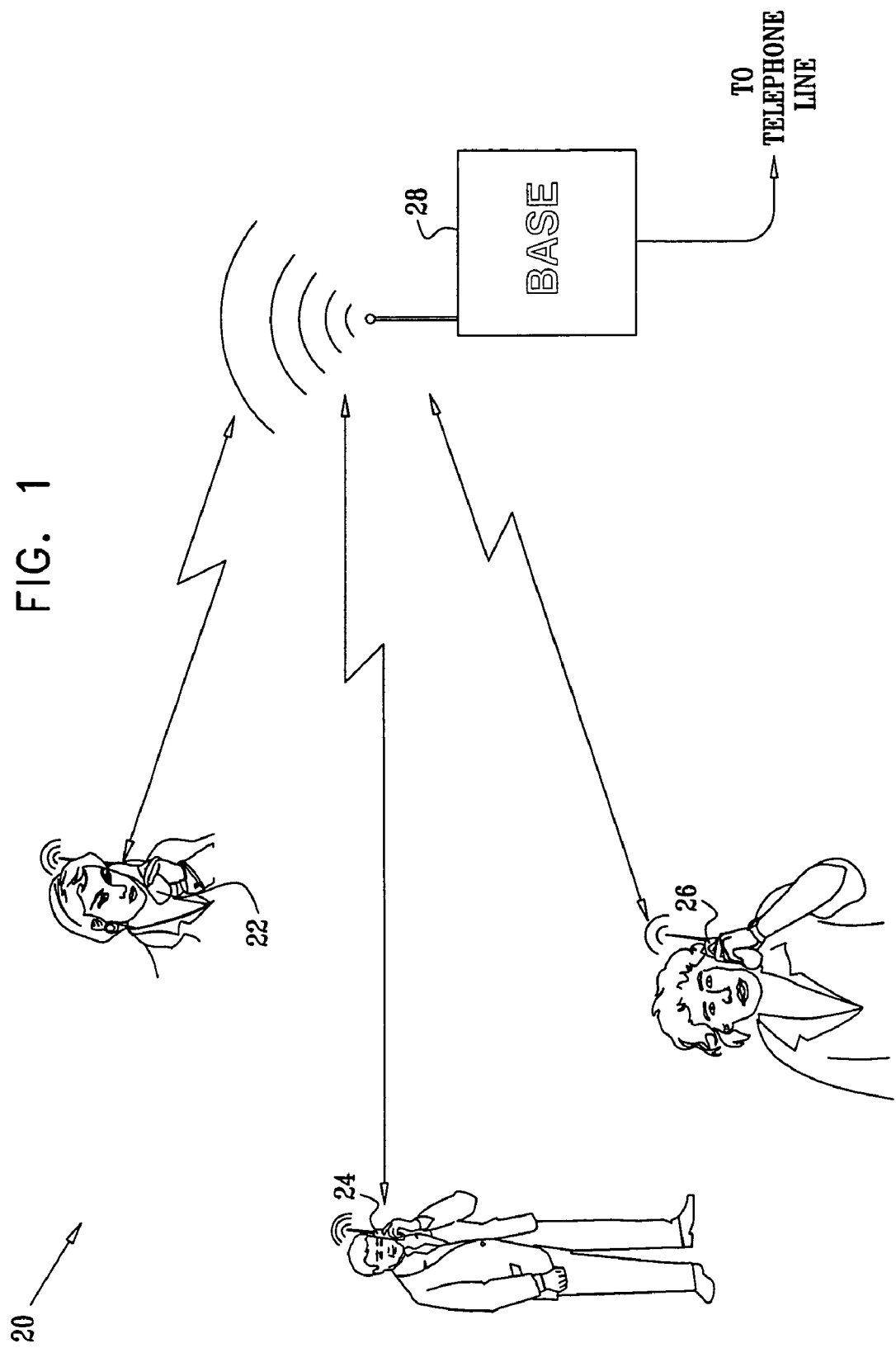
FIG. 1 is a schematic, pictorial illustration of a wireless communication system, in accordance with an embodiment of the present invention.

FIG. 1 is a schematic, pictorial illustration of a wireless communication system 20, in accordance with an embodiment of the present invention. In the present embodiment, system 20 is pictured as a cordless telephone system, in which multiple handsets 22, 24, 26 communicate with a base station 28 using time-division multiplexing (TDM). Although three handsets are shown in this embodiment, the multiplexing methods described hereinbelow may be applied using smaller or larger numbers of handsets. It should also be understood that this particular embodiment is shown only by way of example, and that the principles of the present invention may similarly be applied in other types of TDM wireless communication systems, as are known in the art.

Handsets 22, 24 and 26 communicate over the air with base station 28 by transmitting and receiving digital audio data, typically modulated in a high-frequency band, such as the 2.4 or 5.8 GHz band. The base station converts the audio data to baseband audio signals for transmission over a telephone line, and similar converts incoming signals from the telephone line to digital data at high-frequency for transmission to the handsets. The handsets convert the data back to audio signals for output to users of the system. To combat the interference and fading effects that commonly occur in high-frequency bands, system 20 uses frequency hopping in combination with a novel technique for retransmission on demand, as described hereinbelow. Although this retransmission technique is particularly useful at high frequencies, in conjunction with frequency hopping, it may be applied in wireless communication systems operating in substantially any frequency band in which occasional retransmission is required.

Figure 2:
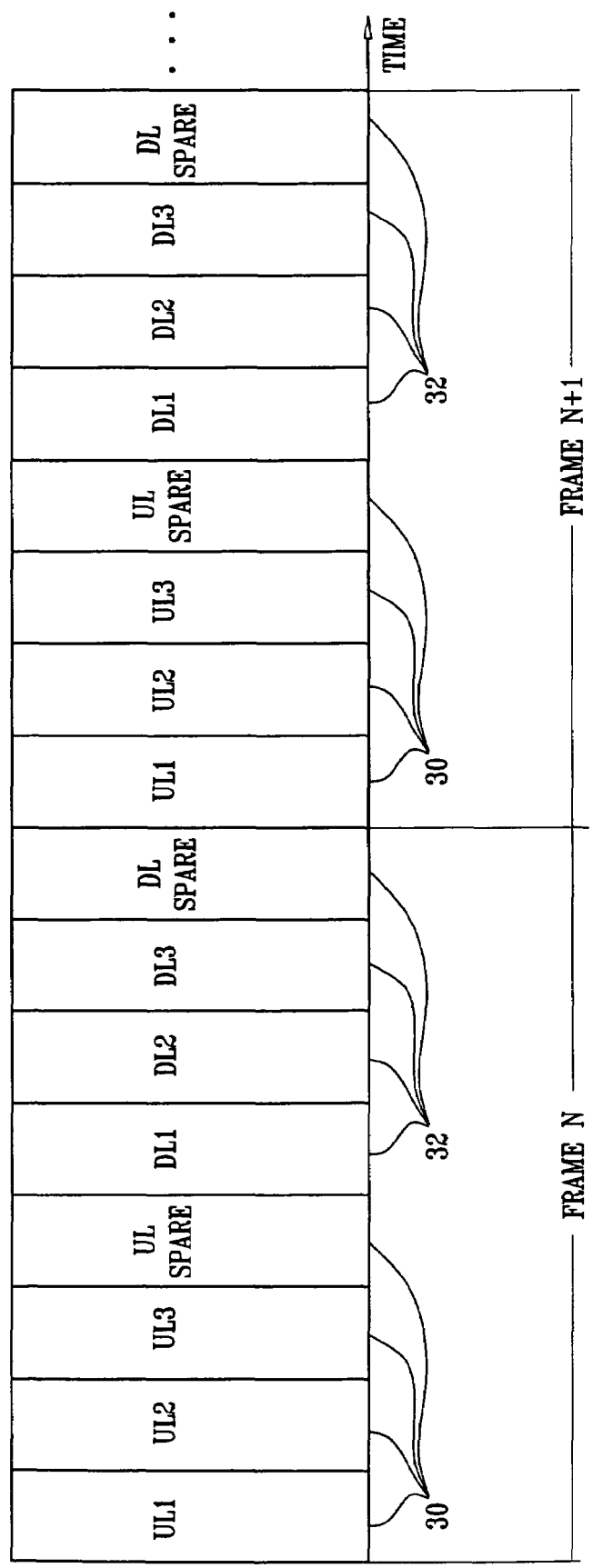
FIG. 2 is a timing diagram that schematically illustrates a TDM scheme used in wireless communications, in accordance with an embodiment of the present invention.

FIG. 2 is a timing diagram that schematically illustrates a TDM scheme used in system 20, in accordance with an embodiment of the present invention. The communication time base is divided into a succession of frames, two of which (frames N and N+1) are shown in the figure. In audio applications of this sort, for example, the frames are typically in the range of 10 ms in duration. Each frame in this embodiment is divided into eight time slots: four uplink transmission slots 30, and four downlink transmission slots 32. Uplink slots UL1, UL2 and UL3 are respectively assigned to handsets 22, 24 and 26 (identified hereinafter as HS1, HS2 and HS3) for uplink transmission to base station 28. Similarly, downlink slots DL1, DL2 and DL3 are assigned for downlink transmission from the base station to each of the handsets. A spare uplink slot (UL-spare) and downlink slot (DL-spare) are reserved for retransmission on demand, as described hereinbelow.

Transmission in each slot takes place at an assigned frequency, according to a predetermined frequency hopping scheme. Table I below shows one possible scheme that may be used in system 20:

TABLE I

FREQUENCY HOPPING

| Slot: | UL1 | UL2 | UL3 | UL-S | DL1 | DL2 | DL3 | DL-S |
|---|---|---|---|---|---|---|---|---|
| Frame N Frequency | f1 | f2 | f3 | f4 | f1 | f2 | f3 | f4 |
| Frame N + 1 Frequency | f5 | f6 | f7 | f8 | f5 | f6 | f7 | f8 |

(Here UL-S and DL-S refer to the spare slots shown in FIG. 2.) Typically, the frequencies f1, f2, . . . , correspond to carriers separated by about 1 MHz. Alternatively, other frequency hopping schemes may be used, as will be apparent to those skilled in the art. For instance, downlink slots DL1, DL2, etc., in each frame may use different frequencies from the corresponding uplink slots, rather than repeating the same frequencies as in the example shown in Table I.

Figure 3A:
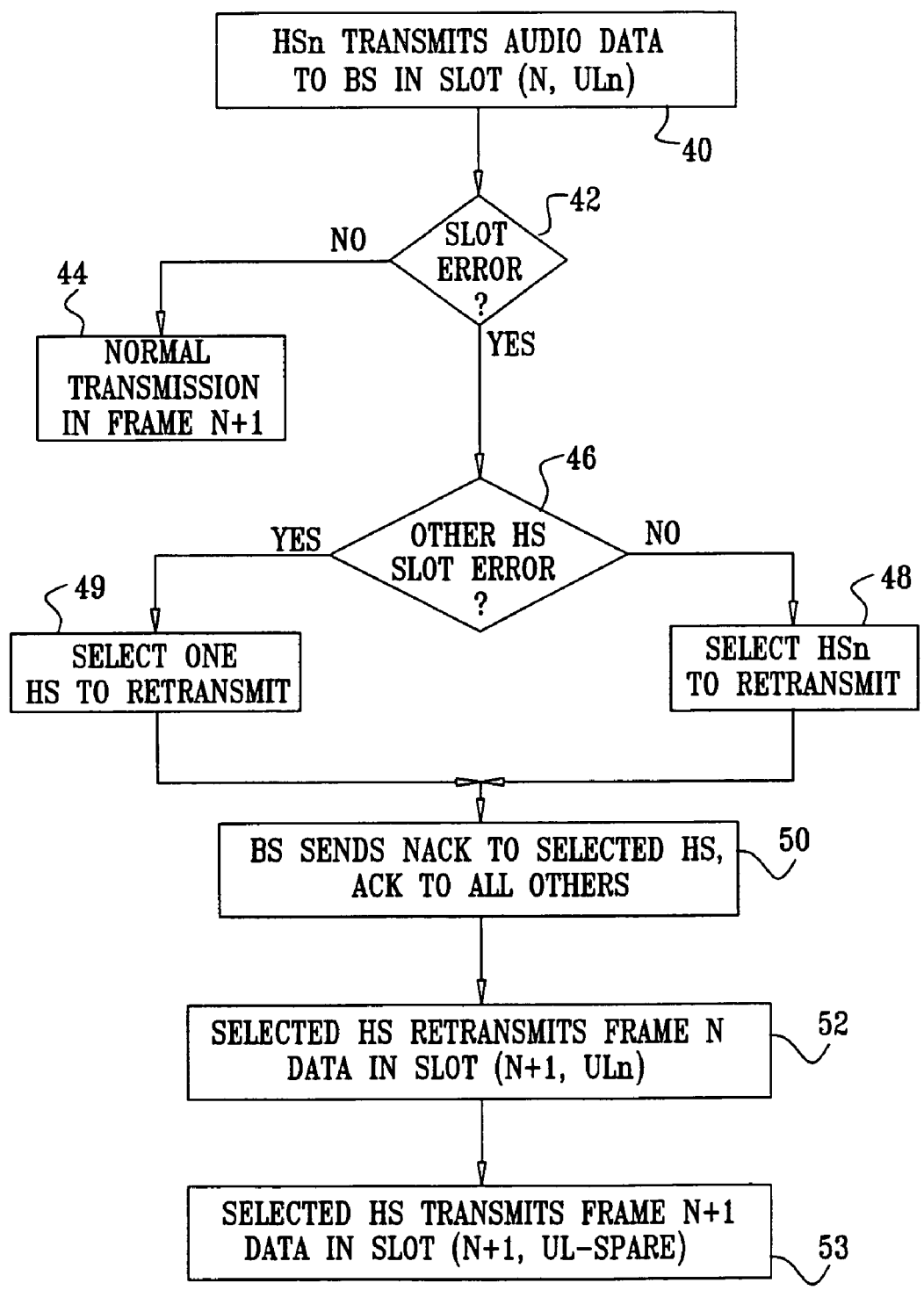
FIGS. 3A and 3B are flow charts that schematically illustrates a method for retransmission on demand, in accordance with an embodiment of the present invention.
Figure 3B:
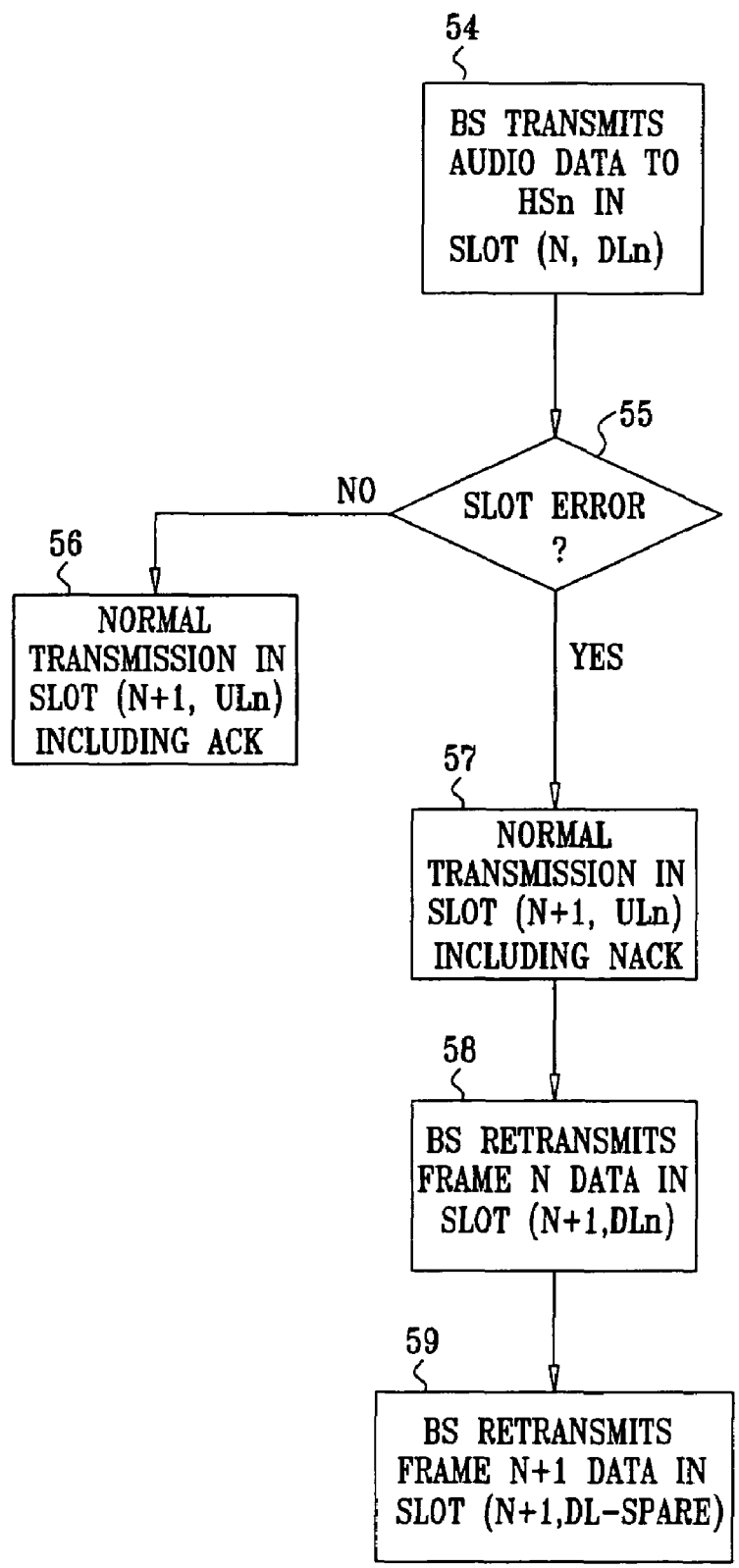

FIGS. 3A and 3B are flow charts that schematically illustrates a method for retransmission on demand used in system 20, in accordance with an embodiment of the present invention. FIG. 3A shows how the method is applied to retransmission of uplink signals, while FIG. 3B applies to downlink signals. In these flow chart, the notation (M,ULj) is used to designate uplink slot j of frame M, while (M,DLj) designates downlink slot j of frame M. The method is described for convenience with reference to handset HS1, but this choice is arbitrary, and the method is equally applicable to the other handsets in system 20.

As shown in FIG. 3A, HS1 transmits digital audio data to base station 28 in its assigned uplink slot (N,UL1) in frame N, at a normal uplink transmission step 40. The base station receives and evaluates the transmission, at an error assessment step 42, in order to determine whether it is necessary to request retransmission of the data in this slot. For example, if interference or fading in the slot is so severe that the base station is unable to synchronize its receiver with the clock of the transmitted data, retransmission will be required. In less severe cases, the base station may compute the bit error rate (BER) of the uplink data, using an error detection code, such as a cyclic redundancy code (CRC) or parity bits. If the BER is above a certain threshold, the base station may determine the data to be corrupted, and will accordingly mark the slot as requiring retransmission. As long as the base station receives the slot data with an acceptably low error rate, however, no retransmission is required. In this case, the handset just goes on with normal uplink transmission in the next frame, at a normal continuation step 44.

It is possible that uplink data received in the same frame from other handsets, such as HS2 or HS3, may also be corrupted and thus require retransmission. Base station 28 receives and evaluates the uplink transmissions from these other handsets, at an alternate error assessment step 46. If only slot UL1 requires retransmission in frame N, the base station will go ahead designate HS1 to retransmit the lost data in frame N+1, at a single handset designation step 48. On the other hand, if the base station determines that transmission errors have occurred in more than one slot in frame N, the base station must choose one of the handsets to retransmit its data in the next frame, at an arbitration step 49. (If more than one slot has been reserved in each frame for retransmission, the base station may choose more than one handset to retransmit in the next frame.) Various criteria may be applied by the base station in choosing the handset that is to retransmit its data, for example:

The slot that had the most severe error or highest BER may be chosen for retransmission. The data from the other slots may be accepted despite the errors, or may be dropped.

The base station may choose the handsets to retransmit in a round robin or other fair arbitration scheme.

The base station may choose the handsets according to a predetermined order of priority.

Other selection criteria will be apparent to those skilled in the art. In the present example, it is assumed that HS1 is selected to retransmit its frame N uplink data.

In order to notify the selected handset (HS1) that it should retransmit the frame N uplink data, base station 28 sends a NACK (negative acknowledge) signal to HS1 in the assigned downlink slot, DL1, at a NACK step 50. All the other handsets receive ACK (positive acknowledge) signals. The NACK signal indicates to HS1 that the base station has reserved two slots for use by HS1 in frame N+1: the regular assigned slot UL1, and the reserved slot UL-spare. In response to the NACK signal, HS1 retransmits its frame N uplink data in slot UL1 of frame N+1, at a retransmission step 52. It then transmits its frame N+1 uplink data in slot UL-spare of frame N+1, at an additional transmission step 53. When frequency hopping is used, as in the example shown in Table I, HS1 transmits the uplink data at steps 52 and 54 at different frequencies (f5 and f8 in this example) from the frequency that it used (f1) in the unsuccessful transmission at step 40.

HS1 may also decide to retransmit its frame N data if it receives no signal (neither ACK nor NACK) in the DL1 slot. Failure to receive the downlink signal may be symptomatic of strong fading or interference during the DL1 slot. Particularly in the example shown in Table I, in which the same frequency is used for both UL1 and DL1, failure to receive the downlink signal is a likely indicator that the uplink signal in UL1 was not received at the base station either. Therefore, under these circumstances, HS1 may perform the retransmission routine of steps 52 and 53 when it fails to receive either ACK or NACK at step 50. Retransmission of the uplink signal upon failure to receive a downlink signal is not limited to the specific frequency hopping pattern shown in Table I, and may optionally be used in any case.

As shown in FIG. 3B, downlink retransmission by base station 28 may be invoked and used in a similar manner. Here, too, for the sake of convenience, we assume that it is handset HS1 that requires retransmission, although the method may equally be applied by any of the handsets.

Base station 28 transmits downlink audio data to HS1 in its assigned uplink slot (N,DL1) in frame N, at a normal downlink transmission step 54. HS1 receives and evaluates the transmission, at an error assessment step 55, in order to determine whether it is necessary to request retransmission of the data in this slot. As long as the handset receives the slot data with an acceptably low error rate, no retransmission is required, and the handset goes on with normal uplink transmission in the next frame, at a normal continuation step 56. The uplink transmission in slot UL1 of frame N+1 in this case includes uplink data, if applicable, and an ACK signal to the base station.

On the other hand, if the error rate is found at step 55 to be excessive, HS1 signals to base station 28 that it requires retransmission, by transmitting a NACK to the base station in its assigned uplink slot, UL1, in frame N+1, at a NACK step 57. In response to the NACK, base station 28 retransmits the frame N downlink data in slot DL1 of frame N+1, at a retransmission step 58. (As noted above with respect to uplink retransmission, the base station may also choose to retransmit downlink data when it fails to receive any uplink signal—either ACK or NACK—during slot UL1.) The base station then transmits the frame N+1 downlink data to HS1 in the reserved slot DL-spare, at an additional transmission step 59. As in the case of uplink retransmission, if more than one handset requests retransmission in a given frame, the base station chooses one of the handsets to receive retransmission in (N+1, DL-spare). The base station may signal the handsets in their assigned downlink slots (DL-1, 2 or 3) to inform each handset as to whether or not it should expect to receive an additional downlink transmission in the reserved slot.

FIG. 4 is a block diagram that schematically shows elements of base station 28, in accordance with an embodiment of the present invention. A radio receiver 60 receives and processes uplink signals from handsets 22, 24, 26, in order to recover the transmitted data. These data are stored in respective FIFO queues in a memory buffer 62. The data are then read out of the buffer to a telephone line interface 64, which converts the data to baseband signals in appropriate form for transmission over the telephone line.

Buffer 62 is of sufficient size to hold approximately one full frame of uplink data in each FIFO queue, so that the data may be read out of the buffer to line interface 64 in a smooth, continuous data stream even when retransmission is required. This buffering, however, adds an audio path delay of approximately one frame (10 ms in the present example). To avoid this added delay, a link quality controller 66 may be used to activate data buffering only when it is likely to be needed. Typically, controller 66 monitors the strength of the signals received from each of handsets 22, 24, 26. As long as the signal strength from a given handset is high, controller 66 minimizes the length of the FIFO queue that is maintained in buffer 62 for that handset. When the signal strength of a given handset degrades to below some limit, however (for example, when the user of the handset moves away from the base station), controller 66 gradually lengthens the FIFO queue to prepare for the possibility of retransmission. The buffer may similarly be gradually shortened as the signal strength increases. The increase or decrease in the audio path delay is thus less noticeable and bothersome to the user. It is also possible to abruptly apply or remove the buffering delay in response to the audio content of the signal, for example, when there is no audio content during a VOX muting period.

A similar receiver buffering arrangement may be used in each of handsets 22, 24, 26. Of course, transmit buffering in both the handsets and the base station is also required in order to permit retransmission when demanded. Although details of the internal structure of the handsets and base station in system 20 are omitted here for the sake of brevity and simplicity, implementation of the techniques described above in existing wireless communication systems will be apparent to those skilled in the art. As noted earlier, these techniques may be used not only in cordless telephone systems, but also in wireless communication systems of other types, particularly systems in which real-time data streams are generated and transmitted, such as audio and video communication systems.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for communication in a sequence of frames, each frame including multiple time slots, the method comprising:

assigning a respective time slot to each of a plurality of mobile units, while reserving an unassigned time slot;

during a first frame, transmitting an uplink signal carrying first uplink data over the air to a base station from one of the mobile units in the respective time slot;

transmitting a downlink signal from the base station to the one of the mobile units indicating that retransmission of the first uplink data is required; and responsively to the downlink signal, during a second frame subsequent to the first frame, transmitting the uplink signal both in the respective time slot and in the reserved time slot so as to carry the first uplink data and second uplink data over the air to the base station.

2. The method according to claim 1, wherein assigning the respective time slot comprises assigning a respective frequency for use in transmission during each of the time slots according to a predetermined frequency hopping scheme.

3. The method according to claim 2, wherein transmitting the uplink signal during the first frame comprises transmitting the uplink signal at a first frequency, and wherein transmitting the uplink signal during the second frame comprises transmitting the uplink signal at one or more second frequencies, which are different from the first frequency.

4. The method according to claim 1, wherein transmitting the uplink signal comprises transmitting respective first and second uplink signals from first and second mobile units among the plurality of the mobile units in respective, first and second time slots, and wherein transmitting the downlink signal comprises selecting one of the first and second mobile units to retransmit the respective first or second uplink signal in the reserved time slot, and notifying the selected one of the first and second mobile units that the retransmission is required.

5. The method according to claim 1, and comprising buffering the first and second uplink data at the base station, and conveying the buffered data from the base station to a destination in a continuous data stream.

6. The method according to claim 5, wherein buffering the first and second uplink data comprises controlling a length of a buffer in which the uplink data are held responsively to at least one of a quality of the uplink signal and an audio content of the uplink signal.

7. The method according to claim 6, wherein controlling the length of the buffer comprises, while the audio content comprises voice data, at least one of lengthening the buffer gradually as the quality of the uplink signal degrades, and shortening the buffer gradually as the quality of the uplink signal improves.

8. The method according to claim 7, wherein controlling the length of the buffer comprises, when the uplink signal comprises no audio content, at least one of lengthening and shortening the buffer abruptly.

9. The method according to claim 1, and comprising, upon a failure to receive the downlink signal at the one of the mobile units, transmitting the uplink signal both in the respective time slot and in the reserved time slot so as to carry the first uplink data and second uplink data over the air to the base station during the second frame.

10. A method for communication in a sequence of frames, each frame including multiple time slots, the method comprising:
assigning a respective time slot to each of a plurality of mobile units, while reserving an unassigned time slot;
during a first frame, transmitting a downlink signal carrying first downlink data over the air from a base station to one of the mobile units in the respective time slot;
transmitting an uplink signal from the one of the mobile units to the base station indicating that retransmission of the first downlink data is required; and
responsively to the uplink signal, during a second frame subsequent to the first frame, transmitting the downlink signal both in the respective time slot and in the reserved time slot so as to carry the first downlink data and second downlink data over the air to the one of the mobile units.

11. The method according to claim 10, wherein assigning the respective time slot comprises assigning a respective frequency for use in transmission during each of the time slots according to a predetermined frequency hopping scheme.

12. The method according to claim 11, wherein transmitting the downlink signal during the first frame comprises transmitting the downlink signal at a first frequency, and wherein transmitting the downlink signal during the second frame comprises transmitting the downlink signal at one or more second frequencies, which are different from the first frequency.

13. The method according to claim 10, wherein transmitting the downlink signal during the first frame comprises transmitting respective first and second downlink signals to first and second mobile units among the plurality of the mobile units in respective, first and second time slots, and
wherein transmitting the uplink signal comprises transmitting first and second uplink signals indicating that the retransmission is required, and
wherein transmitting the downlink signal during the second frame comprises selecting one of the first and second mobile units, and transmitting the downlink signal both in the respective time slot and in the reserved time slot to the selected one of the first and second mobile units.

14. The method according to claim 10, and comprising buffering the first and second downlink data at the one of the mobile units, and processing the buffered data in the one of the mobile units to generate a continuous output data stream.

15. The method according to claim 14, wherein buffering the first and second downlink data comprises controlling a length of a buffer in which the downlink data are held responsively to at least one of a quality of the downlink signal and an audio content of the downlink signal.

16. The method according to claim 15, wherein controlling the length of the buffer comprises, while the audio content comprises voice data, at least one of lengthening the buffer gradually as the quality of the downlink signal degrades, and shortening the buffer gradually as the quality of the downlink signal improves.

17. The method according to claim 16, wherein controlling the length of the buffer comprises, when the downlink signal comprises no audio content, at least one of lengthening and shortening the buffer abruptly.

18. The method according to claim 10, and comprising, upon a failure to receive the uplink signal at the base station, transmitting the downlink signal both in the respective time slot and in the reserved time slot so as to carry the first downlink data and second downlink data over the air to the one of the mobile units during the second frame.

19. Apparatus for communication, comprising a base station and a plurality of mobile units, which are adapted to communicate using a sequence of frames, each frame comprising multiple time slots, wherein a respective time slot is assigned to each of the mobile units, while reserving an unassigned time slot,
wherein each of the mobile units among the plurality of the mobile units is adapted to transmit an uplink signal in the respective time slot during a first frame, the uplink signal carrying first uplink data over the air to the base station, and
wherein the base station is adapted, upon receiving the uplink signal, to transmit a downlink signal to a given mobile unit indicating that retransmission of the first uplink data is required, and
wherein the given mobile unit is adapted, responsively to the downlink signal, to transmit the uplink signal during a second frame, subsequent to the first frame, both in the respective time slot and in the reserved time slot so as to carry the first uplink data and second uplink data over the air to the base station.

20. The apparatus according to claim 19, wherein the base station and the mobile units are adapted to transmit the uplink and downlink signals during each of the time slots according to a predetermined frequency hopping scheme.

21. The apparatus according to claim 20, wherein in accordance with the frequency hopping scheme, the given mobile unit is adapted to transmit the uplink signal during the first frame at a first frequency, and to transmit the uplink signal during the second frame at one or more second frequencies, which are different from the first frequency.

22. The apparatus according to claim 19, wherein the plurality of the mobile units comprises first and second mobile units, which are adapted to transmit respective first and second uplink signals in respective, first and second time slots, and
wherein the base station is adapted, responsively to the first and second uplink signals, to select one of the first and second mobile units to retransmit the respective first or second uplink signal in the reserved time slot, and to notify the selected one of the first and second mobile units that the retransmission is required.

23. The apparatus according to claim 19, wherein the base station comprises a memory, and is adapted to buffer the first and second uplink data in the memory, and to the buffered data to a destination in a continuous data stream.

24. The apparatus according to claim 23, wherein the base station is adapted to control a length of a buffer in which the uplink data are held in the memory responsively to at least one of a quality of the uplink signal and an audio content of the uplink signal.

25. The apparatus according to claim 24, wherein the base station is adapted to control the length of the buffer while the audio content comprises voice data by performing at least one of lengthening the buffer gradually as the quality of the uplink signal degrades, and shortening the buffer gradually as the quality of the uplink signal improves.

26. The apparatus according to claim 25, wherein the base station is adapted to control the length of the buffer when the uplink signal comprises no audio content by performing at least one of lengthening and shortening the buffer abruptly.

27. The apparatus according to claim 19, wherein the given mobile unit is adapted, upon a failure to receive the downlink signal, to transmit the uplink signal during the second frame both in the respective time slot and in the reserved time slot so as to carry the first uplink data and second uplink data over the air to the base station.

28. Apparatus for communication, comprising a base station and a plurality of mobile units, which are adapted to communicate using a sequence of frames, each frame comprising multiple time slots, wherein a respective time slot is assigned to each of the mobile units, while reserving an unassigned time slot,
    wherein the base station is adapted to transmit a downlink signal carrying first downlink data over the air to each of the mobile units in the respective time slot during a first frame, the downlink signal carrying first downlink data over the air to each of the mobile units, and
    wherein when a given mobile unit among the plurality of the mobile units determines, upon receiving the downlink signal, that retransmission of the first downlink data is required, the given mobile unit is adapted to transmit an uplink signal to the base station requesting the retransmission, and
    wherein the base station is adapted, responsively to the uplink signal, to transmit the downlink signal during a second frame, subsequent to the first frame, both in the respective time slot and in the reserved time slot so as to carry the first downlink data and second downlink data over the air to the given mobile unit.

29. The apparatus according to claim 28, wherein the base station and the mobile units are adapted to transmit the uplink and downlink signals during each of the time slots according to a predetermined frequency hopping scheme.

30. The apparatus according to claim 29, wherein in accordance with the frequency hopping scheme, the base station is adapted to transmit the downlink signal during the first frame at a first frequency, and to transmit the downlink signal during the second frame at one or more second frequencies, which are different from the first frequency.

31. The apparatus according to claim 28, wherein the plurality of the mobile units comprises first and second mobile units, and the base station is adapted to transmit respective first and second downlink signals to the first and second mobile units in respective, first and second time slots, and
    wherein the first and second mobile units are adapted to transmit first and second uplink signals indicating that the retransmission is required, and
    wherein the base station is adapted, responsively to the first and second uplink signals, to select one of the first and second mobile units, and to transmit the downlink signal both in the respective time slot and in the reserved time slot to the selected one of the first and second mobile units.

32. The apparatus according to claim 28, wherein each of the mobile units comprises a memory, and is adapted to buffer the first and second downlink data in the memory, and to process the buffered data so as to generate a continuous output data stream.

33. The apparatus according to claim 32, wherein each of the mobile units is adapted to control a length of a buffer in which the downlink data are held responsively to at least one of a quality of the downlink signal and an audio content of the downlink signal.

34. The apparatus according to claim 33, wherein each of the mobile units is adapted to control the length of the buffer while the audio content comprises voice data by performing at least one of lengthening the buffer gradually as the quality of the uplink signal degrades, and shortening the buffer gradually as the quality of the uplink signal improves.

35. The apparatus according to claim 34, wherein each of the mobile units is adapted to control the length of the buffer when the uplink signal comprises no audio content by performing at least one of lengthening and shortening the buffer abruptly.

36. The apparatus according to claim 28, wherein the base station is adapted, upon a failure to receive the uplink signal, to transmit the downlink signal during the second frame both in the respective time slot and in the reserved time slot so as to carry the first downlink data and second downlink data over the air to the given mobile unit.

* * * * *